Feb. 19, 1929.
F. W. PETERS
UNIVERSAL JOINT
Filed July 14, 1927 — 2 Sheets-Sheet 1
1,702,363
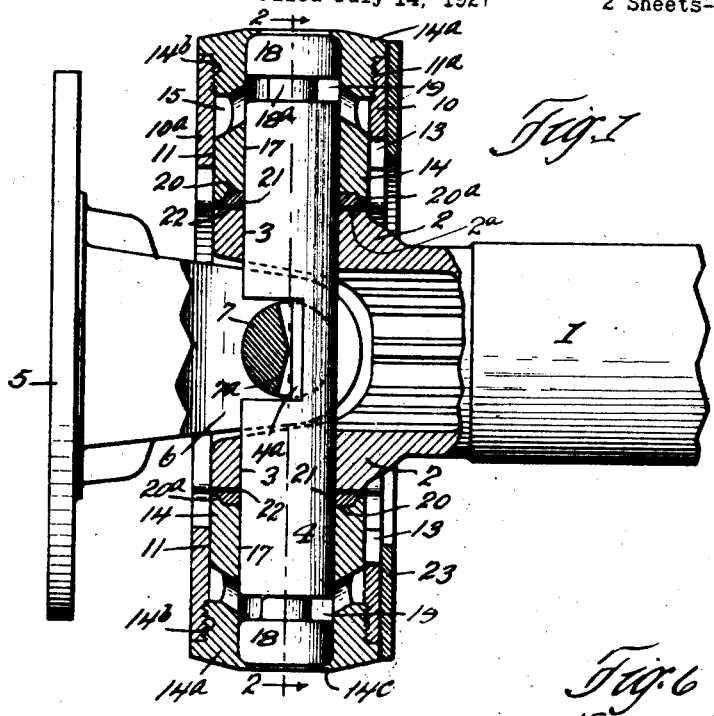
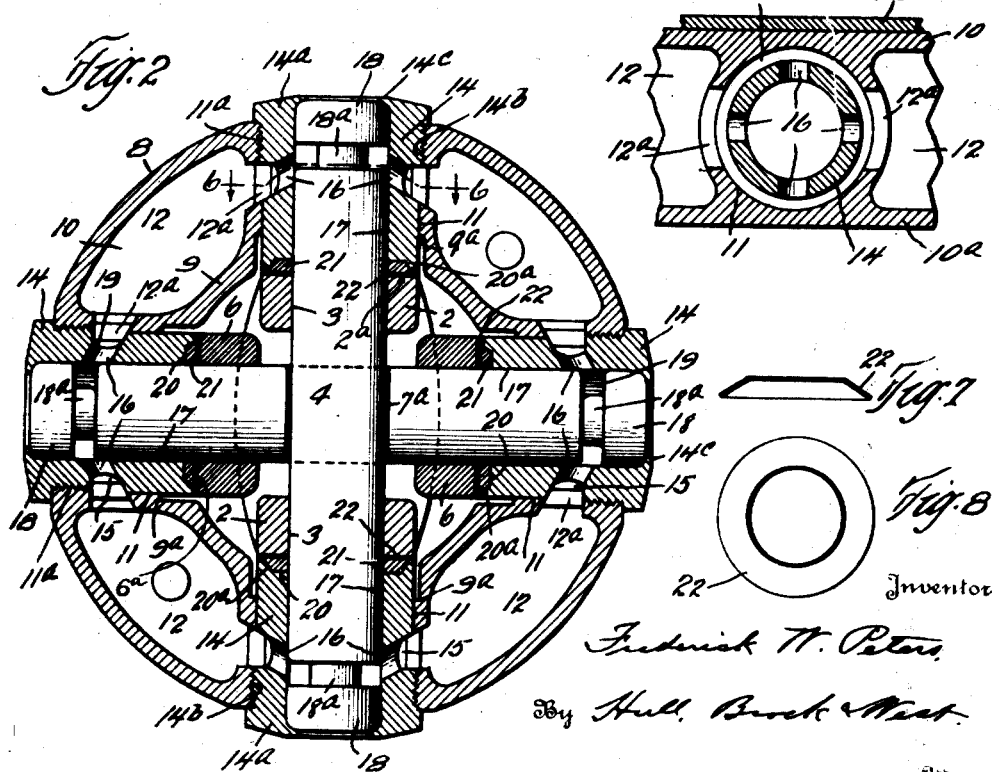
Inventor
Frederick W. Peters
By Hull, Brock & West
Attorney

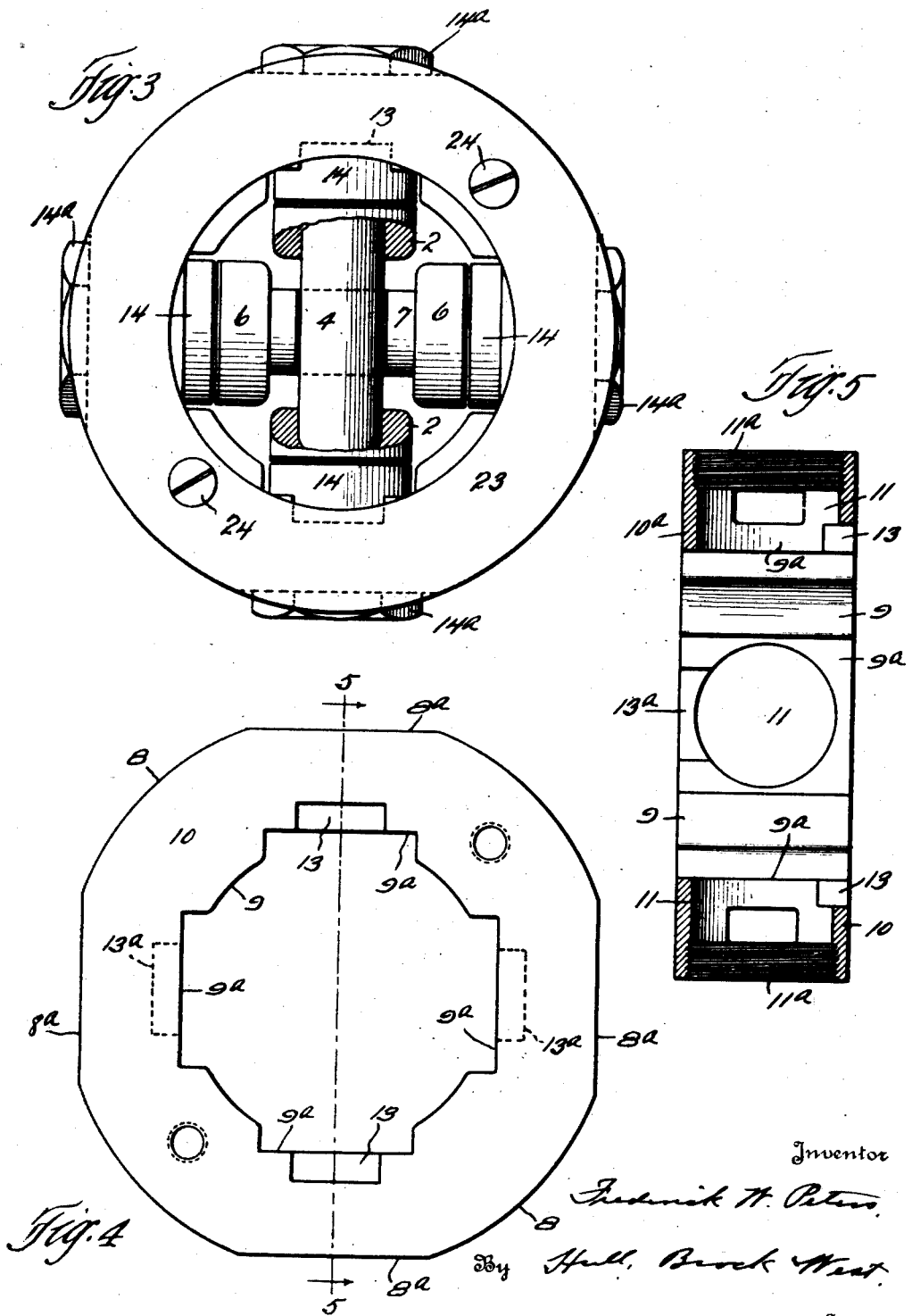

Patented Feb. 19, 1929.

1,702,363

UNITED STATES PATENT OFFICE.

FREDERICK W. PETERS, OF CLEVELAND, OHIO, ASSIGNOR TO THE ALMETAL UNIVERSAL JOINT COMPANY, OF CLEVELAND, OHIO, A CORPORATION OF OHIO.

UNIVERSAL JOINT.

Application filed July 14, 1927. Serial No. 205,601.

My invention relates to universal joints and more particularly to joints of the character wherein a hollow lubricant-containing ring is employed as the connecting means between the trunnions provided at the ends of the driving and driven members so connected.

It is the general purpose and object of the invention to provide a joint of this character which will be simple of construction and inexpensive of production, and which may be conveniently assembled and disassembled. A further object is to provide, in a joint of this character, an improved construction of trunnion-pin, bushing, and improved means for securing the bushings in place which will permit of the convenient adjustment thereof. Further and more limited objects of the invention will appear hereinafter and will be covered by the claims appended hereto.

In the drawings Fig. 1 represents a central sectional view through a universal joint constructed in accordance with my invention, certain parts being shown in elevation; Fig. 2, a sectional view corresponding substantially to the line 2—2 of Fig. 1; Fig. 3, an elevation of the joint, with the arms of one of the yokes broken away; Fig. 4, a side elevation of the connecting ring; Fig. 5, a sectional view through the said ring corresponding substantially to the line 5—5 of Fig. 4; Fig. 6, a detail in section corresponding to the line 6—6 of Fig. 2, the thrust block extension being omitted; and Fig. 7 a sectional view and Fig. 8 a plan view of a washer employed with my joint.

Describing the parts by reference characters, 1 represents the hub of one of the members to be connected, the said hub being provided with short yoke arms 2, the arms being provided each with a bore 3 for the reception of a cross pin 4.

5 denotes a flange of the other member which is to be connected, this flange being provided with a pair of short yoke arms 6, similar to the yoke arms 2 and receiving in radial bores thereof a cross pin 7. The central portion of each pin is recessed, as indicated at 4$^a$ and 7$^a$, respectively, for convenience of assembly. The pins 4 and 7 are preferably assembled in their respective yoke arms, each having a driving fit with the bores of said arms.

The connecting ring for the trunnions formed by the ends of the pins 4 and 7 is provided with the outer cylindrical surfaces 8 and the corresponding inner cylindrical surfaces 9. Between adjacent outer cylindrical surfaces, the ring is flattened, as shown at 8$^a$, and between adjacent cylindrical surfaces 9 the ring is provided with outwardly projecting recesses, each having a flattened surface 9$^a$. The centers of the surfaces 8$^a$ are arranged 90° apart and the same is true of the surfaces 9$^a$. The ring is also provided with opposite sides 10 and 10$^a$.

From each of the surfaces 8$^a$ a radial bore 11 extends inwardly through the corresponding inner face 9$^a$ of the ring, the outer portions of the bores being threaded, as shown at 11$^a$. Between adjacent bores, the ring is provided with chambers 12 for lubricant, each chamber being provided with ports 12$^a$ at the opposite ends thereof communicating with the bores 11.

It will be noted, from an inspection of Figs. 2, 4 and 5, that the inner edge of the side 10 of the ring is provided with radially outwardly extending notches 13 and that the side 10$^a$ is also provided with like radially outwardly extending notches 13$^a$, the notches constituting narrow radial outward extensions of the corresponding sides of the recesses 9$^a$, the notches projecting laterally inward from their respective sides and intersecting the bores 11, and the centers of the notches 13 being located 90° from the centers of the notches 13$^a$. The notches 13 and 13$^a$ are of sufficient width to permit the passage therethrough of the trunnions constituted by the outer ends of the pins 4 and 7, thereby facilitating the assembling of the trunnions in their cooperating bores 11.

In each bore is mounted a bushing 14, each said bushing having a head 14$^a$, preferably hexagonal, the diameter of each such head through opposite faces being preferably equal to the width of the outer surface of the ring. Beneath the hexagonal head, the outer portion of each bushing is threaded, as shown at 14$^b$, whereby it is secured in place within its bore 11$^a$; and each bushing is provided with a groove 15 extending therearound and forming an annular distributing chamber with the interior of the bore 11, there being ports 16 extending through the grooved portion of the bushing and preferably converging toward the centers of the outer portions of their respective bores 17, at the angle indicated, the inner ends of the ports communicating with the chamber provided within the outer portion of the bore 17 of the bushing, four such ports being shown.

The bores 17 are of a size to receive snugly therewithin their respective trunnions, and the grooves 15 and ports 16 are so arranged that the lubricant within the chamber 12 will be delivered by centrifugal action through the ports and the chambers provided beyond the ends of the said trunnions.

Within the outer end of the bore of each bushing is mounted a thrust block, each having a head 18 fitting the outer portion of the bore of its bushing and being retained therein by an inwardly extending flange 14ᶜ on the bushing, which flange may be conveniently formed by peening the metal of said head. Each thrust block has also a stem 18ᵃ which is adapted to engage the adjacent trunnion end, there being a chamber 19 provided within the bore of each bushing and between the head 18 and the trunnion pin, for the circulation of the lubricant.

Each bushing extends through a wall 9ᵃ and is provided at its inner end with an annular radially outwardly extending recess, the bottom wall 20 of which surrounds and extends laterally outward from the trunnion in its bore, each recess having a lateral side wall 20ᵃ which is inclined toward the bottom wall and the trunnion in such bushing. Within the recess formed by the walls 20, 20ᵃ, there is inserted compressible packing material, indicated at 21, and between such packing material and the adjacent faces 2ᵃ, 6ᵃ of the yoke arms 2 and 6 respectively, is interposed a washer 22, which washer is preferably of the spring type shown in my Patent No. 1,621,216, granted March 15, 1927. It will be evident that, by screwing the bushings home in their respective seats, the packing material will be compressed within the annular recesses formed at the inner ends of the bushings and that the shape of these recesses will cause the packing material to be compressed about the trunnions extending therethrough, thereby preventing leakage of lubricant, this compression being increased by the inner edge portion of each washer 22.

For the purpose of preventing the bushings from unscrewing and also for the purpose of holding them in their adjusted positions within their respective bores 11, I employ a flat ring 23, which is secured to the side 10 of the connecting ring by means of bolts 24, the ring 23 extending outwardly a sufficient distance to engage the adjacent faces of the heads 14ᵃ, thereby to prevent the bushings from unscrewing or turning in their seats. Should it become necessary to adjust any one or more of the bushings so as to compensate for wear, the bolts 24 may be slacked off, the ring 23 removed, and the particular bushing or bushings given a rotation sufficient to take up the slack and bring a face of its head 14ᵃ in position to be engaged by the ring 23, after which the bolts 24 may be set up.

In assembling the member 1, with its cross pin in place, will be inserted through the notches 13, with the trunnions in the bores 11, after which the bushings, with the thrust blocks therein, may be inserted into their seats and screwed home, seeing that the packings 21 and the washers 22 are in place. Then the member 5, with its cross pin in place, may be inserted through the notches 13ᵃ into the other bores, and the bushings and thrust blocks applied to the ends of the pins in the same manner. After the bushings shall have been screwed home, the plate 23 will be secured in place. While the distance between the ends of the pins 4 is greater than the distance between the bottoms of the notches 13, the pins may be inserted into the bores 11 by tilting the ring with reference to each pin so that one end of a pin may be inserted through one of the notches and the pin then moved upwardly in the corresponding bore until the opposite end can be inserted through the opposed notch 13. The capability of the ring to be so tilted and the diameters of the bores 11 as compared with the diameters of the pins 4 enable the assembly to be made in this manner.

By reason of the construction described, I am enabled to produce a joint of the hollow lubricating-ring type, which is simple of construction; which can be very readily assembled and disassembled; which will enable the bushings to be conveniently adjusted to compensate for wear; and which will insure the efficient lubrication of the trunnion pins without leakage.

Having thus described my invention, what I claim is:

1. In a universal joint, the combination of a driving and a driven member each having trunnions, a hollow lubricant-containing connecting ring provided with quarteringly spaced radially extending bores therethrough, a bushing threaded in each bore and adapted to receive a trunnion, each bushing having a polygonal head and one or more ports for the distribution of lubricant from the ring to the trunnion in such bushing, a thrust block in the outer end of each bushing adapted to engage the end of the trunnion in such bushing, there being a chamber provided in each bushing beyond the outer end of each trunnion for the reception of lubricant from said ring, and a plate secured to one of the sides of the said ring and adapted to engage the head of each bushing thereby to prevent movement of such bushing in its bore.

2. In a universal joint, the combination of a driving and a driven member each having trunnions, a connecting ring provided with quarteringly spaced radially extending bores therethrough, a radially adjustable bushing in each bore adapted to receive a trunnion, each bushing having a polygonal head, a thrust block in the outer end of each bushing adapted to engage the end of the trunnion in such bushing, and a plate secured to one side of the said ring and adapted to engage the head of each bushing thereby to prevent movement of such bushing in its bore.

3. In a universal joint, the combination of a driving and a driven member each having trunnions, a hollow lubricant-containing connecting ring provided with quarteringly spaced radially extending bores therethrough each communicating with the interior of the said ring, a bushing mounted in each bore and receiving a trunnion in its own bore, each bushing being provided with one or more lateral ports therethrough adapted to communicate with the interior of said ring, and a thrust block in the outer end of the bore of each bushing, each block having a reduced stem arranged to engage the end of the trunnion in the bore of such bushing, the said stem being of less cross sectional area than the end of the trunnion engaged thereby and the said stem and head providing an annular chamber in such bushing bore beyond the end of the trunnion therein which chamber communicates with the port or ports in said bushing.

4. In a universal joint, the combination of a driving and a driven member each provided with trunnions, a hollow lubricant-containing connecting ring having quarteringly-spaced, radially extending bores therethrough, the ring being provided on each side thereof with diametrically opposed notches extending inwardly from such side, the notches on one side of the ring being spaced approximately 90° from the notches on the opposite side and the said notches intersecting the said bores, a bushing projecting into each bore from the outer end thereof and adapted to be adjusted radially inwardly along such bore and to receive a cooperating trunnion therein, each bushing being provided with a port communicating with the lubricant-containing space of the ring and arranged to permit the flow of lubricant by centrifugal action across the outer end of the trunnion therein, and a thrust block in the outer end of each bushing having a reduced stem adapted to engage the end of the trunnion therein and being of less cross sectional area than the cross sectional area of such end of said trunnion whereby the supply of lubricant to and across the outer end of such trunnion may be accomplished without interruption by said pin.

5. In a universal joint comprising a driving and a driven member each provided with trunnions, a connecting ring having quarteringly spaced, radially extending bores therethrough adapted to receive said trunnions, a bushing threaded into each bore and having a head at its outer end, and means for holding a bushing in adjusted position in its bore, said means comprising a plate secured to a side of said ring and adapted to engage a lateral surface on said head.

6. In a universal joint, the combination of a driving and a driven member each provided with trunnions, a hollow lubricant-containing ring having quarteringly spaced, radially extending bores therethrough adapted to receive said trunnions, a bushing inserted into the outer portion of each bore and each having a head at its outer end and a thread adapted to mesh with a thread in said bore, a thrust device in each bushing adapted to engage the outer end of the trunnion therein, each bushing having means to permit the circulation of lubricant from the ring therethrough and beyond the end of the trunnion therein and each bushing having a seat at the inner end thereof, packing material in said seat and surrounding an adjacent portion of the trunnion and adapted to be compressed about said trunnion by the inward adjustment of the bushing, and a plate secured to one side of the said ring and adapted to engage the heads on the bushings thereby to prevent rotation of the same.

7. In a universal joint, the combination of a hollow lubricant-containing ring having quarteringly spaced radially extending bores therethrough, a driving and a driven member each having yokes and trunnions carried by said yokes, with an annular seat on each yoke surrounding a trunnion, a bushing adapted to be inserted in each bore and radially adjustable therein and adapted to receive a trunnion, each bushing having one or more ports adapted to communicate with the lubricant-containing space of the ring and to deliver lubricant therefrom to the trunnion in such bushing, the inner end of each bushing being provided with an annular radially extending seat the bottom wall of which extends laterally outward from the trunnion and the side wall of which is inclined toward the first mentioned wall and the trunnion, packing material in each seat arranged to be compressed therein by the radial inward adjustment of the bushing, and a washer interposed between the said packing material and the annular seat on the yoke which surrounds the trunnion, said washer being of resilient material and having its inner edge in a different plane from its outer edge whereby, when compressed by the adjustment of the bushing cooperating therewith, the inner edge will tend to compact the packing material in the seat of said bushing.

In testimony whereof, I hereunto affix my signature.

FREDERICK W. PETERS.